Nov. 10, 1970  E. N. BARNES  3,538,595
PROCESS FOR FORMING A CONTAINER
Filed Oct. 27, 1967
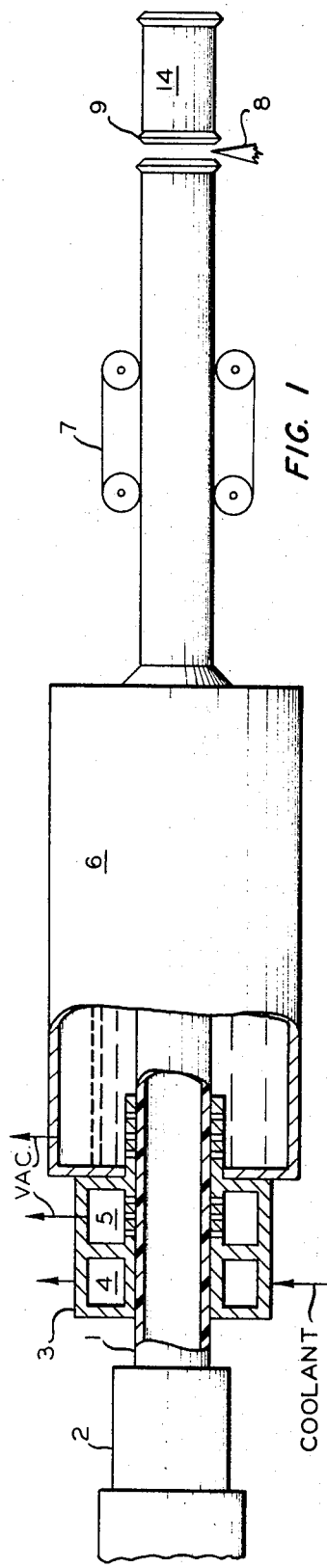
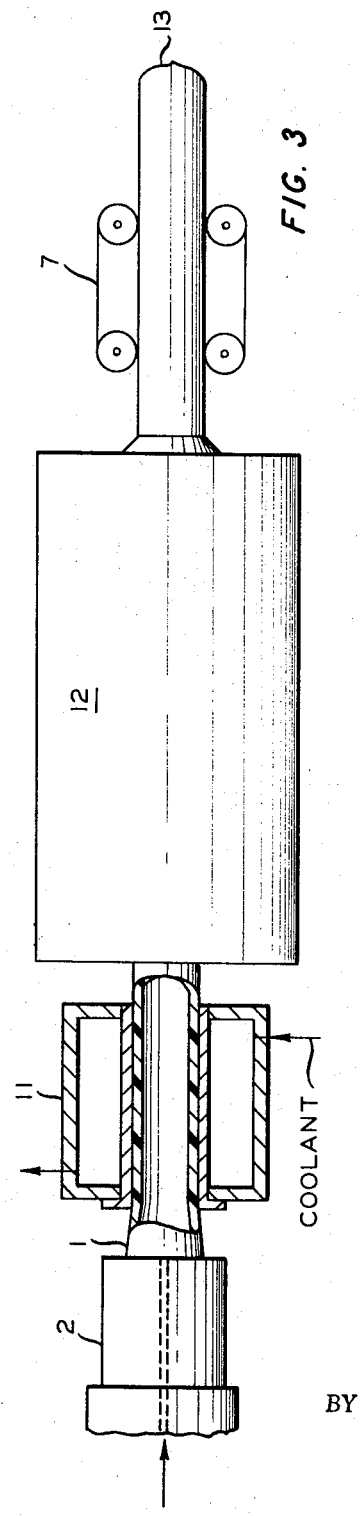
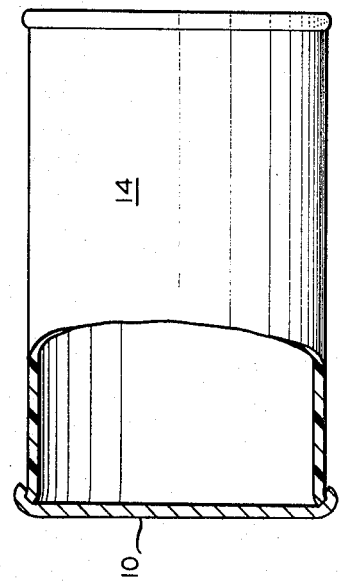
INVENTOR.
E. N. BARNES
BY
ATTORNEYS

3,538,595
PROCESS FOR FORMING A CONTAINER
Estil N. Barnes, Bartlesville, Okla., assignor to Phillips Petroleum Company, a corporation of Delaware
Filed Oct. 27, 1967, Ser. No. 678,752
Int. Cl. B29c 17/14, 25/00; B29f 3/08
U.S. Cl. 29—511                                  8 Claims

ABSTRACT OF THE DISCLOSURE

A container is formed by shock cooling the exterior of thin walled plastic tubing at extrusion temperatures to create internal stresses in the walls. When cut, the severed ends of the tubing will flare outwardly, and end pieces are attached thereto to form a container.

BACKGROUND OF THE INVENTION

The use of thermoplastic materials in the packaging field has become widely accepted. The light weight, resiliency, attractiveness, chemical resistance, and ease of cleaning and sterilization of these thermoplastics have made containers or packages formed from these materials and containers extremely popular for many applications, even in applications where their cost is somewhat above that of competing containers.

In the petroleum industry, thermoplastic materials are currently being used for containers for packaging of oil, particularly for outboard motor use. The use of such containesr for packaging automotive oil has lagged behind because these containers have not been economically competitive with foil-lined fiber cans.

My invention is a container particularly adapted for use in packaging oil which is competitive with fiber foil containers. The economy of my container results from a manufacturing process which eliminates a considerable amount of labor and equipment in producing the containers with a resultant saving in cost.

SUMMARY OF THE INVENTION

In accordance with the invention, a process for producing container components from tubular elements is provided which comprises extruding a thermoplastic tube, shock chilling the extruded tube to create internal stress in the walls of the tube, and cutting the tube into desired lengths whereby the stresses cause the ends of the tube to flare outwardly.

The containers of my invention comprise a length of thin-walled thermoplastic tubing having flared ends, and end pieces engaged by the flared ends.

The tubing container components are made by shock cooling a length of thermoplastic thin-walled tubing on the exterior surface in such manner as to set up internal stresses within the walls of the tubing. Following the shock cooling, the tubing is cut into desired lengths. The internal stresses which were introduced by means of the shock cooling will cause the ends of the severed tubing to flare outwardly immediately upon cutting.

End pieces can be attached to one or both ends of the flared tubing described above by known means to form the containers of my invention. Although known methods have been used to flare the ends of thermoplastic tubes in order to attach end pieces thereto, it has not previously been known that such flaring could be accomplished by the mere cutting of a shock-cooled tubing.

DESCRIPTION OF THE DRAWINGS

FIG. 1 shows a presently preferred method of forming the flared tubes suitable for use in making my container, partly in cross-section.

FIG. 2 shows a completed container made from the flared tubing, partly in cross-section.

FIG. 3 shows another method of forming the flared tubing, partly in cross-section.

Now referring to FIGS. 1 and 2, thermoplastic tubing 1 is extruded in conventional manner from an extruder generally designated as 2. Immediately after emerging from the extruder, the tubing passes through sizing ring 3 wherein the diameter of the tubing is closely controlled. Immediately upon entering the sizing ring, the tubing, which is still substantially at extruding temperatures, is shock cooled. Preferably, this is accomplished by circulating refrigerated water in the first section of the sizing ring designated as 4.

After shock cooling of the exterior surface, the size of the tube is maintained by a vacuum on the second section 5 of the vacuum sizing ring. The tubing emerges from the vacuum sizing ring into a cooling tank 6 which is kept under vacuum and gradually cooled either in air or in tap water to room temperature. After the tubing emerges from a conventional tubing puller 7, it is cut into desired lengths 14 by means of blades 8.

Because of the stresses introduced into the thermoplastic tubing by the shock cooling, the severed ends of the tube will immediately flare outward on both sides of blades 8. This outward flare 9 is well adapted for receiving an end piece such as crimped metal end piece 10 as shown in FIG. 2. The application of such an end piece is well known in the art. End pieces can be applied to one or both ends of the severed tubing depending on the ultimate use of the container. If desired, one end piece can be attached, the container filled, and the other end piece subsequently attached.

Now, referring to FIG. 3, in a second embodiment, the tubing 1 is extruded in a conventional manner from extruder 2. Immediately after emerging from the extruder, the tubing is shock cooled by refrigerated water circulated in sizing ring 11. The tubing is maintained against the sizing ring by an internal fluid pressure of approximately one atmosphere applied in the conventional manner by pinching one end 13 of the tube closed. Upon emerging from the sizing ring, the tubing enters open cooling tank 12 and is cooled to room temperature by tap water. After passing through a conventional tubing puller 7, the tubing is removed for cutting into flared container lengths by a cutting device.

DESCRIPTION OF THE PREFERRED EMBODIMENTS

The thermoplastic materials which have been found suitable for forming the containers of my invention include the homopolymers and copolymers of alpha-olefins having from 2-8 carbon atoms per molecule. Particularly suited are the homopolymers and copolymers of ethylene, such as polyethylene, ethylene-propylene copolymer, and ethylene-butene-1 copolymer, and the homopolymers and copolymers of propylene including polypropylene, propylene-ethylene copolymer, and the like. It should be understood, however, that the above list of suitable thermoplastic materials is exemplary only, and my invention is not limited thereto. The invention is equally applicable to any thermoplastic material which will flare outwardly upon cutting following a shock cooling operation.

In order to obtain satisfactory flaring of the tubing, the wall thickness of the tubing should be between 25 mils and 50 mils, preferably between 25 mils and 45 mils. The most desirable wall thickness varies somewhat depending upon the particular thermoplastic material being used, and a wall thickness outside these limits could be used for different thermoplastic materials.

Extrusion temperature will, of course, vary depending upon the particular thermoplastic material being extruded, but for the homopolymers and copolymers of ethylene and propylene, extrusion temperature within the range of 350° F. to about 380° F. are generally used.

The tubular elements subjected to shock chilling and cutting according to the invention can be any desired cross-section including cylindrical, rectangular, elliptical, and the like. Cylindrical tubes are presently preferred.

The shock cooling of the exterior walled tubing is most desirably accomplished by cold water circulated through a chilled ring. I have found that a water temperature between about 40° F. and about 70° F., and preferably between 40° F. and 50° F., results in the greatest degree of flaring of the tube. However, other coolants can be employed when desired.

The end pieces used in my container are preferably metal, most generally aluminum, and they are desirably provided with crimpable edges in order to engage the outwardly flared end of the tubing. It is within the scope of my invention, however, to use other materials for the end pieces, such as thermoplastic materials, and to engate these end pieces to the body of the container by other means, such as a snap fit, adhesive, thermowelding, or any other attachment means.

EXAMPLE

Containers suitable for use as oil cans were made having a body portion of an ethylene-butene-1 copolymer sold under the trademark Marlex 5003. This thermoplastic was extruded from a conventional extruder at a temperature of about 370° F. After extrusion, the extrudate was passed through a sizing tube having an inside diameter 4.113 inches and being 14 inches in length. The tubing was shock cooled using water circulated through the sizing tube at a temperature of 40° F. The cooled tubing had an outside diameter of 4.032 inches and an average wall thickness of 41 mils. After cooling to room temperature, the tubing was cut into appropriate lengths and the severed ends flared outwardly to form an end flange. The width of the flange which developed was approximately 80 mils. An aluminum end cap commonly used on fiber cans was crimped to the flared portions of each tube to form the oil can.

Reasonable variation and modification are possible within the scope of this disclosure, drawings, and appended claims without departing from the spirit of my invention.

I claim:
1. A process for forming a container comprising extruding a thermoplastic tube having a wall thickness between about 25 mils and about 50 mils, shock cooling the exterior of said tube to create internal stresses in the walls of said tube, cutting said tube into lengths whereby said internal stresses cause the ends of said tube to flare outwardly, and attaching an end piece to said tube by engagement with said outward flare.

2. The process of claim 1 wherein said thermoplastic is selected from homopolymers or copolymers of ethylene and homopolymers or copolymers of propylene.

3. A process according to claim 1 wherein said shock chilled tube is further cooled to substantially ambient conditions prior to cutting.

4. The process of claim 1 wherein said extrusion tempreature is from about 350° F to about 380° F.

5. The process of claim 1 wherein said shock cooling is accomplished by water circulation having a temperature from about 40° F. to about 70° F.

6. The process of claim 1 wherein said end piece is crimped onto said outward flare.

7. The process of claim 1 wherein said end piece is metal.

8. The process of claim 1 wherein an end piece is attached to each end of said tube.

References Cited

UNITED STATES PATENTS

| | | | |
|---|---|---|---|
| 2,399,422 | 4/1946 | Back | 264—237 X |
| 2,876,496 | 3/1959 | Murphy. | |
| 2,990,580 | 7/1961 | Foster | 264—346 X |
| 3,103,409 | 8/1963 | Bohres | 264—209 |
| 3,169,272 | 2/1965 | Maxson | 264—209 X |
| 3,182,108 | 5/1965 | Branscum | 264—209 |
| 3,212,135 | 10/1965 | Branscum | 264—209 X |
| 3,410,939 | 11/1968 | Driza | 264—159 X |

ROBERT F. WHITE, Primary Examiner

A. M. SOKAL, Assistant Examiner

U.S. Cl. X.R.

264—150, 159, 163, 237